United States Patent
Lee et al.

(10) Patent No.: US 9,551,539 B2
(45) Date of Patent: Jan. 24, 2017

(54) HEAT EXCHANGER AND MANUFACTURING METHOD THEREOF

(71) Applicant: Samsung Electronics Co., Ltd., Suwon-si (KR)

(72) Inventors: Doo Hee Lee, Gwangju (KR); Young Gil Yeo, Yongin-si (KR); Yong Hwa Choi, Hwaseong-si (KR); Young Min Kim, Suwon-si (KR); Gaku Hayase, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 258 days.

(21) Appl. No.: 14/309,068

(22) Filed: Jun. 19, 2014

(65) Prior Publication Data
US 2014/0374077 A1 Dec. 25, 2014

(30) Foreign Application Priority Data
Jun. 19, 2013 (KR) .................. 10-2013-0070593

(51) Int. Cl.
*F28F 1/12* (2006.01)
*F28F 9/02* (2006.01)

(52) U.S. Cl.
CPC . *F28F 1/12* (2013.01); *F28F 9/02* (2013.01); *F28F 2255/00* (2013.01); *Y10T 29/4935* (2015.01)

(58) Field of Classification Search
CPC ............. F28F 1/12; F28F 9/02; F28F 2250/00
See application file for complete search history.

(56) References Cited

U.S. PATENT DOCUMENTS

| | | | | |
|---|---|---|---|---|
| 5,168,923 A | * | 12/1992 | Sacks .................... | B21D 53/04 165/151 |
| 5,349,841 A | * | 9/1994 | Honma .................. | B21D 43/12 226/75 |
| 2009/0145587 A1 | * | 6/2009 | Young .................. | B21D 53/085 165/151 |
| 2009/0307898 A1 | * | 12/2009 | Dees .................... | B21D 39/06 29/727 |
| 2010/0139094 A1 | * | 6/2010 | Branyon ................ | B21D 53/08 29/890.043 |
| 2012/0216664 A1 | * | 8/2012 | Shiozawa ............. | B21D 43/11 83/423 |

* cited by examiner

*Primary Examiner* — Moshe Wilensky
(74) *Attorney, Agent, or Firm* — Staas & Halsey LLP

(57) ABSTRACT

A heat exchanger which may be continuously mass-produced by press-fitting heat exchange fins into refrigerant tubes and a manufacturing method thereof. The manufacturing method includes processing a metal sheet into a plurality of rows of heat exchange fins, transferring the plurality of rows of heat exchange fins through a transfer apparatus, dividing the plurality of rows of heat exchange fins into heat exchange fins in odd-numbered rows and heat exchange fins in even-numbered rows and integrating the heat exchange fins in odd-numbered rows and even-numbered rows through integration apparatuses, vertically standing and aligning the heat exchange fins in odd-numbered rows and even-numbered rows, separating the heat exchange fins in odd-numbered rows and even-numbered rows into a number of heat exchange fins, which may be simultaneously press-fitted into refrigerant tubes, through separation apparatuses, and press-fitting the separated heat exchange fins into the refrigerant tubes.

15 Claims, 12 Drawing Sheets

HEAT EXCHANGER AND MANUFACTURING METHOD THEREOF

CROSS-REFERENCE TO RELATED APPLICATIONS

This application claims the benefit of Korean Patent Application No. 10-2013-0070593, filed on Jun. 19, 2013 in the Korean Intellectual Property Office, the disclosure of which is incorporated herein by reference.

BACKGROUND

1. Field

Embodiments of the present disclosure relate to a heat exchanger which may be continuously mass-produced by press-fitting heat exchange fins into refrigerant tubes and a manufacturing method thereof.

2. Description of the Related Art

In general, an air conditioner is an apparatus which maintains indoor air suitable for daily life using a refrigeration cycle. The air conditioner may cool an indoor space by repeating suction of in warm air in the indoor space, heat exchange between the warm air and a refrigerant of a low temperature, and discharge of the heat-exchanged air to the indoor space, or may heat the indoor space by opposite interaction.

The air conditioner may cool or heat an indoor space by the refrigeration cycle in which air circulates along a compressor, a condenser, an expansion valve, and an evaporator in a regular direction or the reverse direction. The compressor provides a refrigerant in a high-temperature and high-pressure gaseous state, and the condenser provides a refrigerant in a normal-temperature and high-pressure liquid state. The expansion valve decompresses the refrigerant in the normal-temperature and high-pressure liquid state, and the evaporator evaporates the decompressed refrigerant into a low-temperature gaseous state.

Air conditioners may be divided into a split type air conditioner in which an outdoor unit and an indoor unit are separated from each other, and an integration type air conditioner in which an outdoor unit and an indoor unit are integrated. In case of a split type air conditioner in which an outdoor unit and an indoor unit are separated from each other, a compressor and a condenser (an outdoor heat exchanger) are provided in the outdoor unit and an evaporator (an indoor heat exchanger) is provided in the indoor unit. A refrigerant may circulate in the outdoor unit and the indoor unit through pipes connecting the outdoor unit and the indoor unit.

A heat exchanger, such as the condenser of the outdoor unit or the evaporator of the indoor unit, includes refrigerant tubes along which the refrigerant may flow. A plurality of fins is mounted on the refrigerant tubes and may thus improve heat exchange efficiency. Conventional heat exchangers use circular refrigerant tubes but recent heat exchangers may use plate type refrigerant tubes which may reduce resistance received when external air passes through the heat exchangers. Such heat exchangers may be referred to as plate-fin type heat exchangers. Here, a plurality of fins is mounted on plates provided with refrigerant flow paths, thus improving heat exchange efficiency.

In a conventional plate-fin type heat exchanger, grooves or holes into which plates are inserted are formed on fins, and the plate-fin type heat exchanger is manufactured by inserting the plates into the grooves or holes under the condition that the plural fins are stacked. In order to improve contact between the fins and the plates, a clad is applied prior to insertion of the plates. In this case, insertion of the plates into the grooves or the holes may be difficult due to friction between the stacked fins and the plates and, if the plates are forcibly inserted into the grooves or the holes, the fins may be deformed or be non-uniformly located.

SUMMARY

Therefore, it is an aspect of the present disclosure to provide a heat exchanger which may be mass-produced by press-fitting a plurality of fins, stacked by a designated interval, into plates and lower a defect rate in manufacturing, and a manufacturing method thereof.

It is another aspect of the present disclosure to provide a heat exchanger which may increase efficiency in a manufacturing process through an improved structure of a transfer apparatus transferring a plurality of fins, and a manufacturing method thereof.

Additional aspects of the disclosure will be set forth in part in the description which follows and, in part, will be apparent from the description, or may be learned by practice of the disclosure.

In accordance with one aspect of the present disclosure, a manufacturing method of a heat exchanger includes processing a metal sheet into a plurality of rows of heat exchange fins, transferring the plurality of rows of heat exchange fins through a transfer apparatus, dividing the plurality of rows of heat exchange fins into heat exchange fins in odd-numbered rows and heat exchange fins in even-numbered rows and integrating the heat exchange fins in odd-numbered rows and the heat exchange fins in even-numbered rows through integration apparatuses, vertically standing and aligning the heat exchange fins in odd-numbered rows and the heat exchange fins in even-numbered rows, separating the heat exchange fins in odd-numbered rows and the heat exchange fins in even-numbered rows into a number of heat exchange fins, which may be simultaneously press-fitted into refrigerant tubes, through separation apparatuses, and press-fitting the separated heat exchange fins into the refrigerant tubes.

The pressing of the metal sheet into the plurality of rows of heat exchange fins may be performed such that ends of contact ribs of neighboring heat exchange fins are opposite each other.

In the division of the plurality of rows of heat exchange fins into the heat exchange fins in odd-numbered rows and the heat exchange fins in even-numbered rows and the integration of the heat exchange fins in odd-numbered rows and the heat exchange fins in even-numbered rows on the integration apparatuses, the heat exchange fins in odd-numbered rows may be integrated on a first integration apparatus and the heat exchange fins in even-numbered rows may be integrated on a second integration apparatus.

In the vertically standing and aligning of the heat exchange fins in odd-numbered rows and the heat exchange fins in even-numbered rows, the heat exchange fins in odd-numbered rows and the heat exchange fins in even-numbered rows may be rotated such that ends of contact ribs face downward.

In the vertically standing and aligning of the heat exchange fins in odd-numbered rows and the heat exchange fins in even-numbered rows, the heat exchange fins in odd-numbered rows and the heat exchange fins in even-numbered rows may be aligned on integration units by inserting the integration units between neighboring contact ribs of each of the heat exchange fins in odd-numbered rows and the heat exchange fins in even-numbered rows.

In the vertically standing and aligning of the heat exchange fins in odd-numbered rows and the heat exchange fins in even-numbered rows, the heat exchange fins in odd-numbered rows and the heat exchange fins in even-numbered rows may be integrated on the integration units by inserting blades between neighboring contact ribs of each of the heat exchange fins in odd-numbered rows and the heat exchange fins in even-numbered rows.

Vibration may be applied to the integration units, and the heat exchange fins in odd-numbered rows and the heat exchange fins in even-numbered rows may slide along the integration units by vibration applied to the integration units.

The manufacturing method may further include, when the heat exchange fins in odd-numbered rows and the heat exchange fins in even-numbered rows vertically stand and are aligned, transferring the heat exchange fins in odd-numbered rows and the heat exchange fins in even-numbered rows through a collector and integrating the heat exchange fins in odd-numbered rows and the heat exchange fins in even-numbered rows such that neighboring heat exchange fins contact each other.

The heat exchange fins in odd-numbered rows and the heat exchange fins in even-numbered rows may be transferred by blades mounted on a belt and moved such that neighboring heat exchange fins contact each other.

In the separation of the heat exchange fins in odd-numbered rows and the heat exchange fins in even-numbered rows into a number of heat exchange fins, which may be simultaneously press-fitted into the refrigerant tubes, through the separation apparatuses, the heat exchange fins in odd-numbered rows and the heat exchange fins in even-numbered rows may be separated into a number of heat exchange fins, which may be simultaneously press-fitted into the refrigerant tubes, by blades.

In the press-fitting of the separated heat exchange fins into the refrigerant tubes, the separated heat exchange fins may be press-fitted into the refrigerant tubes on which headers are mounted.

The manufacturing method may further include mounting headers on the refrigerant tubes, after the press-fitting of the separated heat exchange fins into the refrigerant tubes.

The processing of the metal sheet into the plurality of rows of heat exchange fins may be performed after the metal sheet wound on a roll is unwound into a state, in which pressing of the metal sheet may be performed, by an uncoiler.

In the vertically standing and aligning of the heat exchange fins in odd-numbered rows and the heat exchange fins in even-numbered rows, the heat exchange fins in odd-numbered rows and the heat exchange fins in even-numbered rows may be integrated on integration units by inserting wires between neighboring contact ribs of each of the heat exchange fins in odd-numbered rows and the heat exchange fins in even-numbered rows.

Vibration may be applied to the wires, and the heat exchange fins in odd-numbered rows and the heat exchange fins in even-numbered rows slide on the integration units by vibration applied to the wires.

In accordance with another aspect of the present disclosure, a heat exchanger includes a plurality of refrigerant tubes provided with flow paths, in which refrigerant flows, formed therein and stacked in the vertical direction, headers combined with both ends of the plurality of refrigerant tubes and communicating the plurality of refrigerant tubes with each other, and a plurality of heat exchange fins combined with the plurality of refrigerant tubes and extending in the vertical direction so as to intersect the plurality of refrigerant tubes, wherein each of the plurality of heat exchange fins includes a plurality of contact ribs interconnected, and interval maintenance parts protruding in the forward and backward direction are provided on each of the plurality of contact ribs.

The interval maintenance parts may include a first maintenance part protruding in the forward direction and a second maintenance part protruding in the backward direction.

The first maintenance part and the second maintenance part are located at positions of each of the plurality of contact ribs opposite each other in a diagonal direction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Hereinafter, a heat exchanger and a manufacturing method thereof in accordance with one embodiment of the present disclosure will be described in detail with reference to the accompanying drawings.

Figure 1:
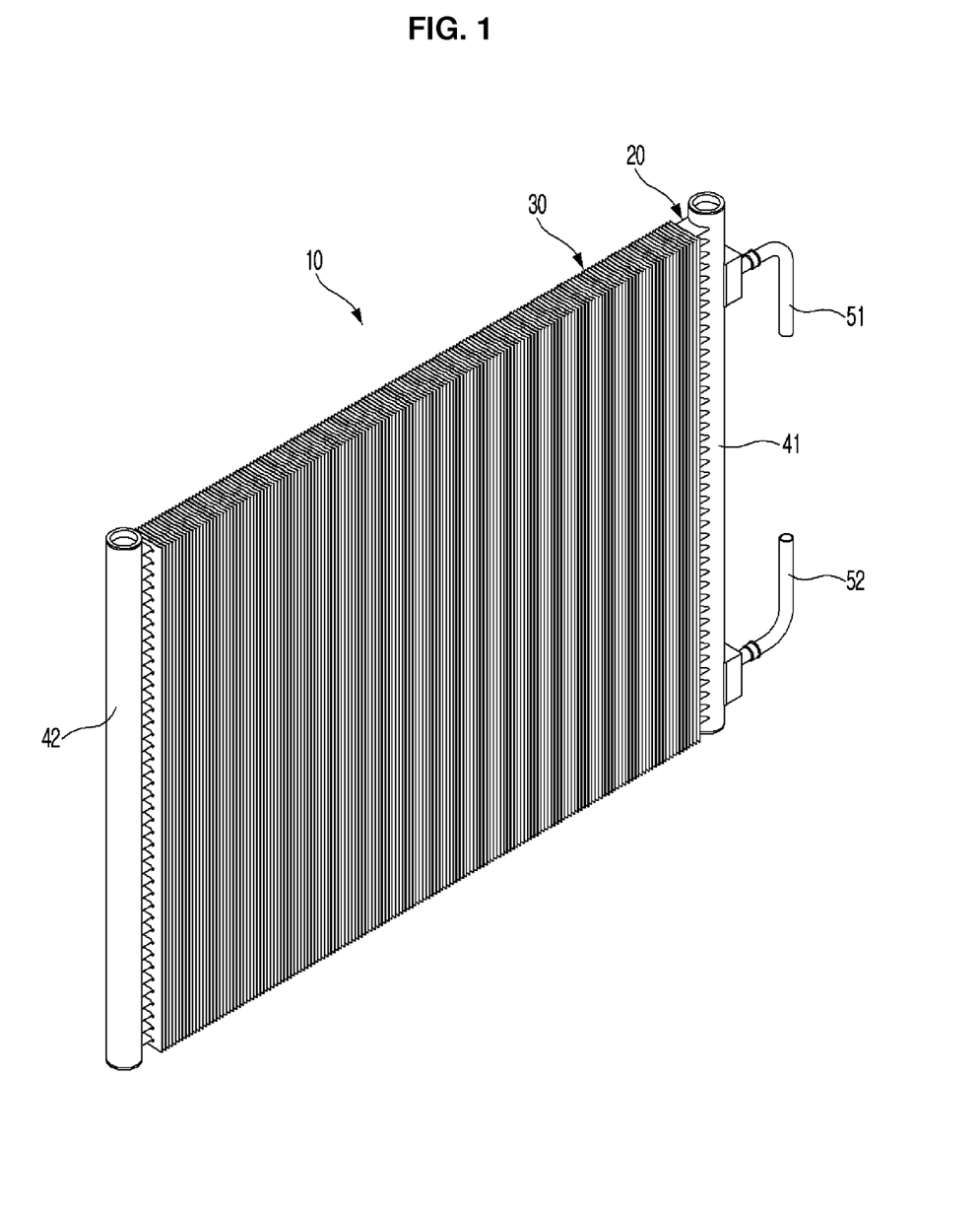
FIG. 1 is a perspective view illustrating a heat exchanger in accordance with one embodiment of the present disclosure.
Figure 2:
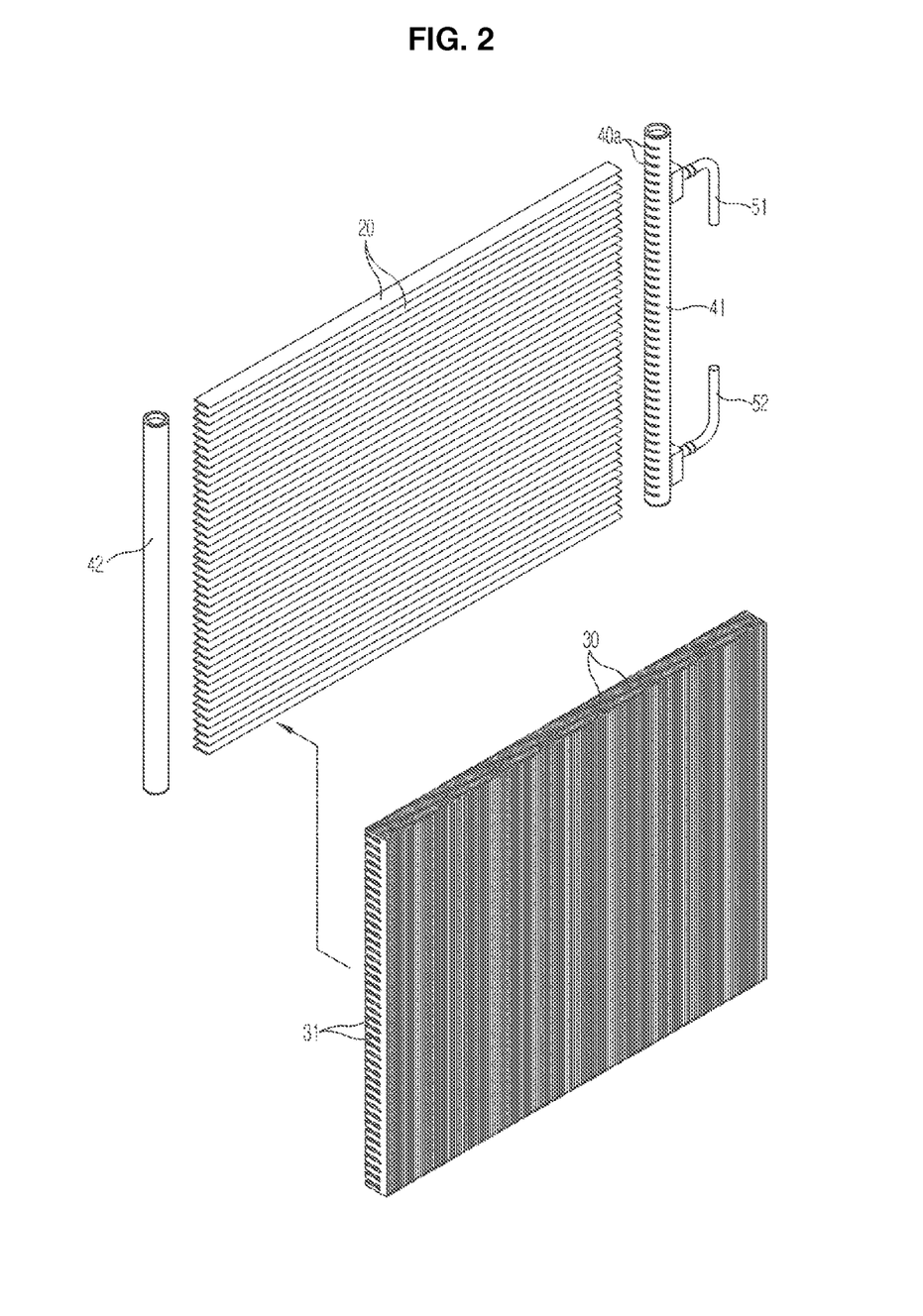
FIG. 2 is an exploded perspective view illustrating the heat exchanger in accordance with the embodiment of the present disclosure.

FIG. 1 is a perspective view illustrating a heat exchanger in accordance with one embodiment of the present disclosure, and FIG. 2 is an exploded perspective view illustrating the heat exchanger in accordance with the embodiment of the present disclosure.

With reference to FIGS. 1 and 2, a heat exchanger 10 in accordance with the embodiment of the present disclosure includes refrigerant tubes 20 and a plurality of heat exchange fins 30. The plural heat exchange fins 30 may be combined with the outer surfaces of the plural refrigerant tubes 20. Headers may be provided at both ends of the plural refrigerant tubes 20.

The refrigerant tubes 20 may be provided in a plate type. A plurality of flow paths along which a refrigerant may flow is provided within the refrigerant tubes 20, and the plurality of flow paths may be divided by diaphragms. The plural refrigerant tubes 20 may be separated by a designated interval and be stacked in the vertical direction. Here, the plural flow paths may extend in the width direction of the refrigerant tubes 20.

The refrigerant exchanges heat with outdoor air while changing phase from a gaseous state to a liquid state (being compressed), or exchanges heat with outdoor air while changing phase from a liquid state to a gaseous state (being expanded). When phase of the refrigerant is changed from the gaseous state to the liquid state, the heat exchanger 10 may be used as a condenser and, when phase of the refrigerant is changed from the liquid state to the gaseous state, the heat exchanger 10 may be used as an evaporator.

The headers include a first header 41 and a second header 42. The first header 41 and the second header 42 are combined with both ends of the plural refrigerant tubes 20 and communicate the plural refrigerant tubes 20 with each other. The first header 41 and the second header 42 which are combined with both ends of the plural refrigerant tubes 20 may communicate the plural refrigerant tubes 20 with each other so that the refrigerant may flow along the plural refrigerant tubes 20.

The first and second headers 41 and 42 are provided as a hollow pipe type. Combination slots 40a may be provided at one side of each of the first and second headers 41 and 42 so that ends of the refrigerant tubes 20 are combined with the combination slots 40a. In order to guide flow of the refrigerant sequentially passing through the refrigerant tubes 20, the inner space of each of the first and second headers 41 and 42 may be divided into a plurality of sub-spaces in the vertical lengthwise direction such that the number of the sub-spaces corresponds to the number of the refrigerant tubes 20. A refrigerant inlet pipe 51 and a refrigerant outlet pipe 52 to guide a refrigerant introduced into the heat exchanger 10 and a refrigerant discharged from the heat exchanger 10 may be connected to the first header 41.

The refrigerant flows along the flow paths formed in the refrigerant tubes 20 and is compressed or expanded, thus discharging heat to the surroundings or absorbing heat from the surroundings. In order to cause the refrigerant to effectively discharge or absorb heat during compression or expansion, the heat exchange fins 30 may be combined with the refrigerant tubes 20.

The heat exchange fins 30 may be disposed to extend in the lengthwise direction in which the refrigerant tubes 20 are stacked. That is, if the refrigerant tubes 20 are stacked in the vertical direction, the heat exchange fins 30 may extend in the vertical direction so as to intersect the refrigerant tubes 20. The plural heat exchange fins 30 may be separated by a designated interval. Such heat exchange fins 30 are joined to the outer surfaces of the refrigerant tubes 20 and serve to increase a heat exchange area between outdoor air passing through spaces between the heat exchange fins 30 and the refrigerant tubes 20. Further, the heat exchange fins 30 may serve to guide flow of condensed water, generated on the surfaces of the refrigerant tubes 20, downward.

Figure 3:
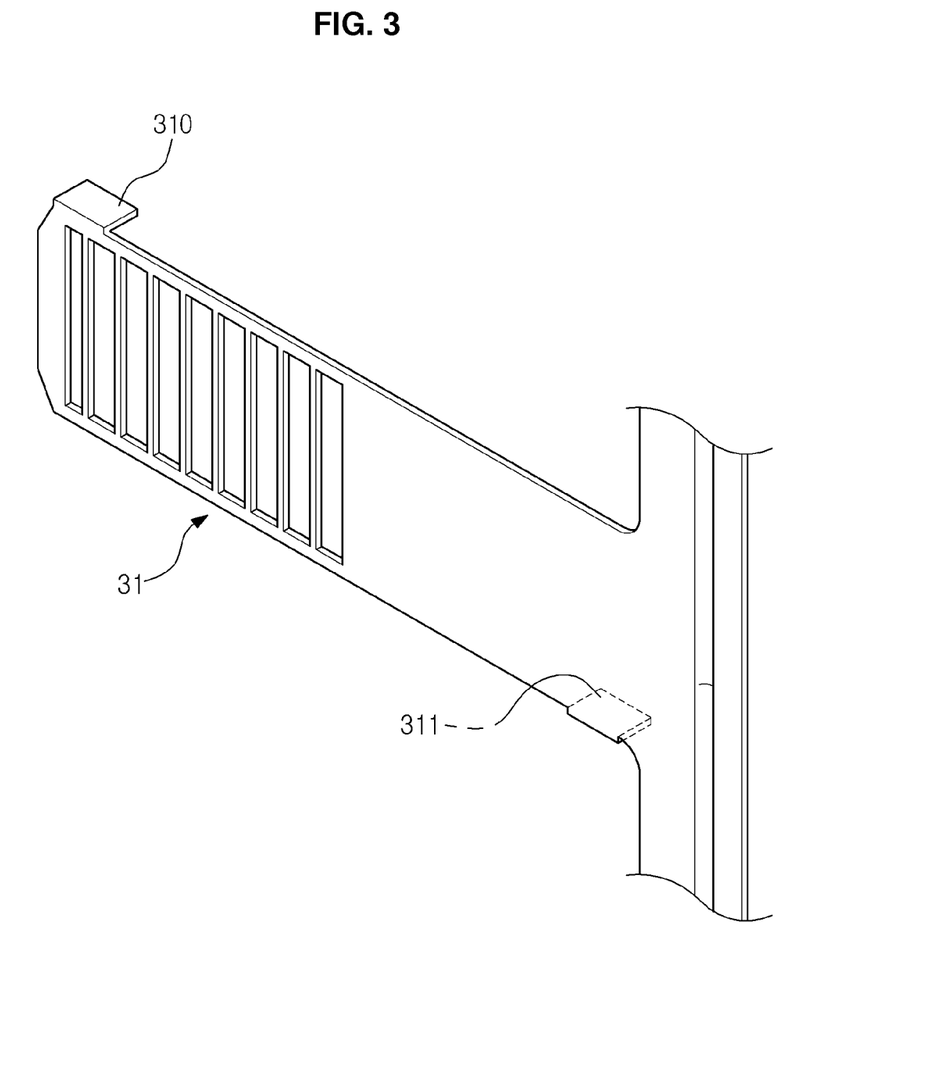
FIG. 3 is a perspective view illustrating a part of a heat exchange fin in accordance with the embodiment of the present disclosure.

FIG. 3 is a perspective view illustrating a part of the heat exchange fin in accordance with the embodiment of the present disclosure.

With reference to FIG. 3, the heat exchange fin 30 in accordance with the embodiment of the present disclosure may include a plurality of contact ribs 31. Designated sides of the plural contact ribs 31 may be interconnected. The plural contact ribs 31 may be inserted into spaces between neighboring refrigerant tubes 20 so as to contact the refrigerant tubes 20. Interval maintenance parts 310 and 311 may be provided on each of the contact ribs 31. The interval maintenance parts 310 and 311 may protrude in the forward or backward direction of the heat exchange fin 30.

The interval maintenance parts 310 and 311 include a first interval maintenance part 310 and a second interval maintenance part 311. The first interval maintenance part 310 and the second interval maintenance part 311 may protrude from positions of the contact ribs 31 opposite each other in a diagonal direction. For example, the first interval maintenance part 310 may protrude in the forward direction of the heat exchange fin 30 and the second interval maintenance part 311 may protrude in the backward direction of the heat exchange fin 30.

Thereby, when the plural heat exchange fins 30 are press-fitted into the refrigerant tubes 20 during manufacture of the heat exchanger 10, the contact ribs 31 of neighboring integrated heat exchange fins 30 may be separated from each other by a designated interval by the first interval maintenance parts 310 and the second interval maintenance parts 311. By separating the contact ribs 31 from each other by the designated interval, air passing through the heat exchanger 10 may smoothly flow and heat exchange efficiency may be raised.

Hereinafter, a manufacturing system of heat exchange fins in accordance with one embodiment of the present disclosure will be described in detail with reference to the accompanying drawings.

Figure 4:
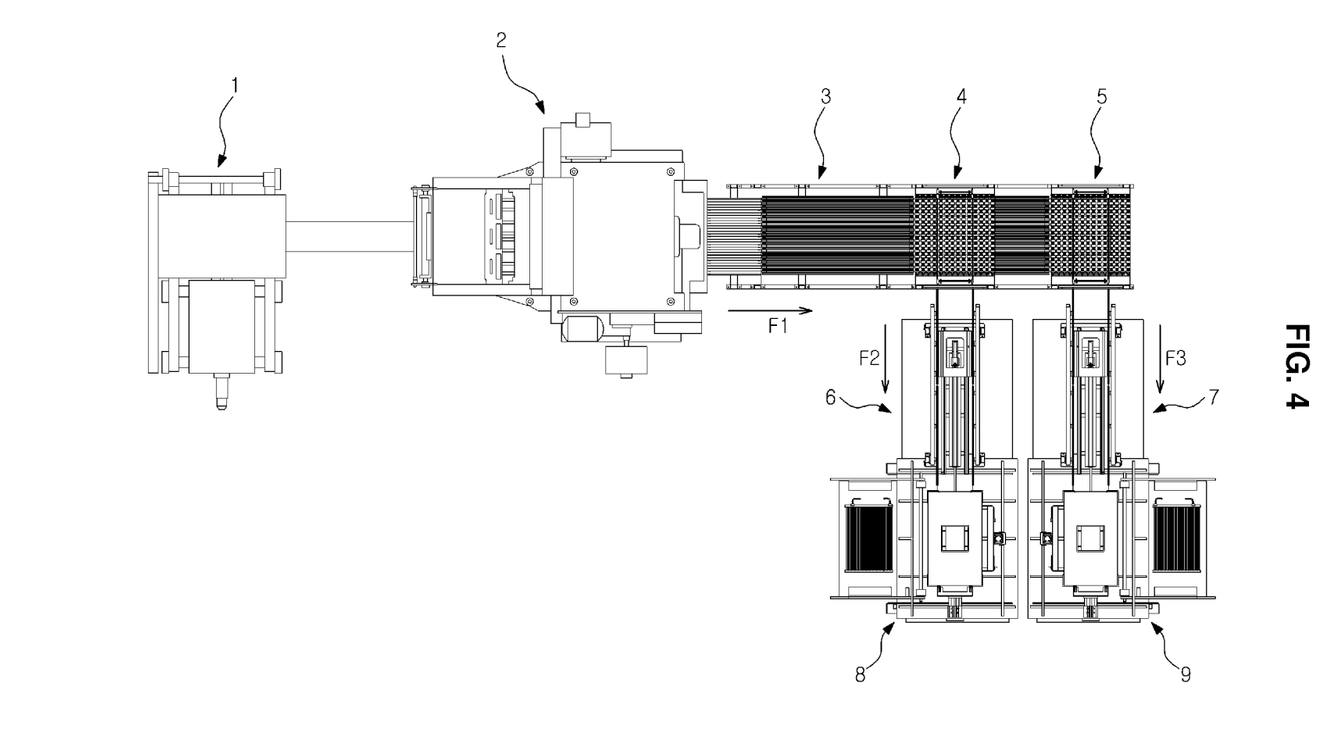
FIG. 4 is a view illustrating a manufacturing system of heat exchange fins in accordance with the embodiment of the present disclosure.
Figure 5:
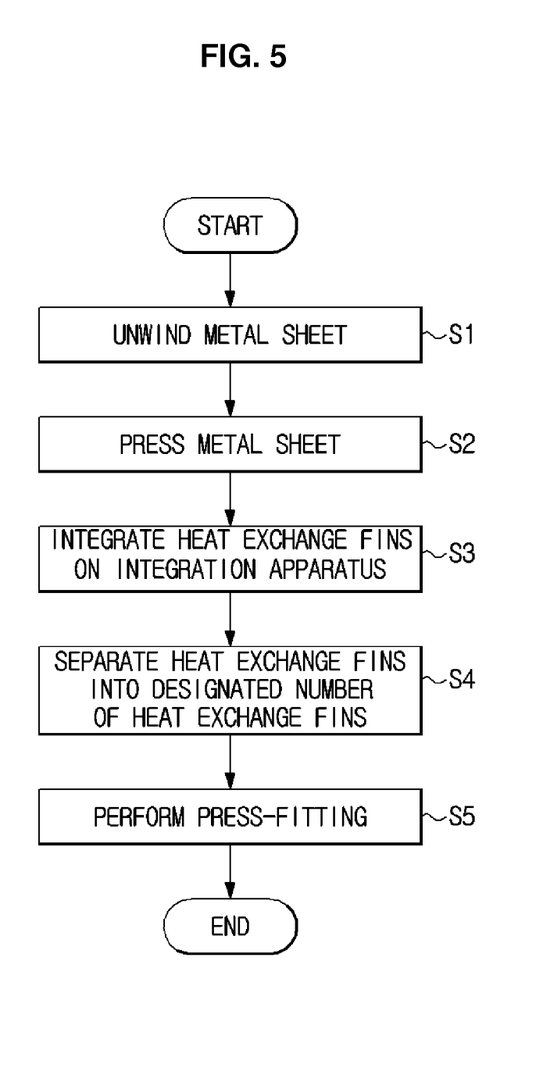
FIG. 5 is a flowchart illustrating a manufacturing method of the heat exchanger in accordance with the embodiment of the present disclosure.

FIG. 4 is a view illustrating a manufacturing system of the heat exchange fins in accordance with the embodiment of the present disclosure, and FIG. 5 is a flowchart illustrating a manufacturing method of the heat exchanger in accordance with the embodiment of the present disclosure.

With reference to FIGS. 4 and 5, the heat exchange fins 30 in accordance with the embodiment of the present disclosure may be formed by pressing a metal sheet used as a material of the heat exchange fins 30. Such a thin metal sheet used as the material of the heat exchange fins 30 may be transferred and stored in a state in which the thin metal sheet is wound on a roll. The metal sheet may be formed of aluminum.

In order to manufacture the heat exchange fins 30, the metal sheet wound on the roll may be unwound by an uncoiler 1 so as to be pressed (Operation 51). The metal sheet unwound by the uncoiler 1 may move to a pressing machine 2 and be located on the pressing machine 2 in a state in which the metal sheet may be pressed.

The metal sheet disposed on the pressing machine 2 under the condition that the metal sheet may be pressed may be punched at high speed by the pressing machine 2, thus being processed so as to have the shape of a heat exchange fin 30 (Operation S2). Heat exchange fins 30 processed by the pressing machine 2 may be arranged in plural rows. Here, the heat exchange fins 30 may be arranged such that the contact ribs 31 of the neighboring heat exchange fins 30 may be opposite each other.

The heat exchange fins 30 acquired by punching using the pressing machine 2 may be transferred to integration apparatuses 4 and 5 in a direction F1 by a transfer apparatus 3 (Operation S3). The plural heat exchange fins 30 processed by the pressing machine 2 may be divided into heat exchange fins 30 in odd-numbered rows and heat exchange fins 30 in even-numbered rows and integrated by the integration apparatuses 4 and 5.

The plural heat exchange fins 30 moved to the integration apparatuses 4 and 5 may move in directions F2 and F3 and pass through alignment apparatuses 6 and 7 (Operation S4). The plural heat exchange fins 30 may move by a collector and be integrated and aligned so that neighboring heat exchange fins 30 may contact. The plural heat exchange fins 30 may be separated into a designated number of heat exchange fins 30, which may be simultaneously press-fitted into the refrigerant tubes 20, and be aligned by the collector.

The designated number of integrated heat exchange fins 30 may be press-fitted to the refrigerant tubes 20 by press-fitting apparatuses 8 and 9 (Operation S5). Thereby, the heat exchanger 10 in which the heat exchange fins 30 are mounted on the refrigerant tubes 20 may be manufactured.

Hereinafter, respective operations of the manufacturing system and manufacturing method of heat exchange fins in accordance with the embodiment of the present disclosure will be described in detail with reference to the accompanying drawings.

Figure 6:
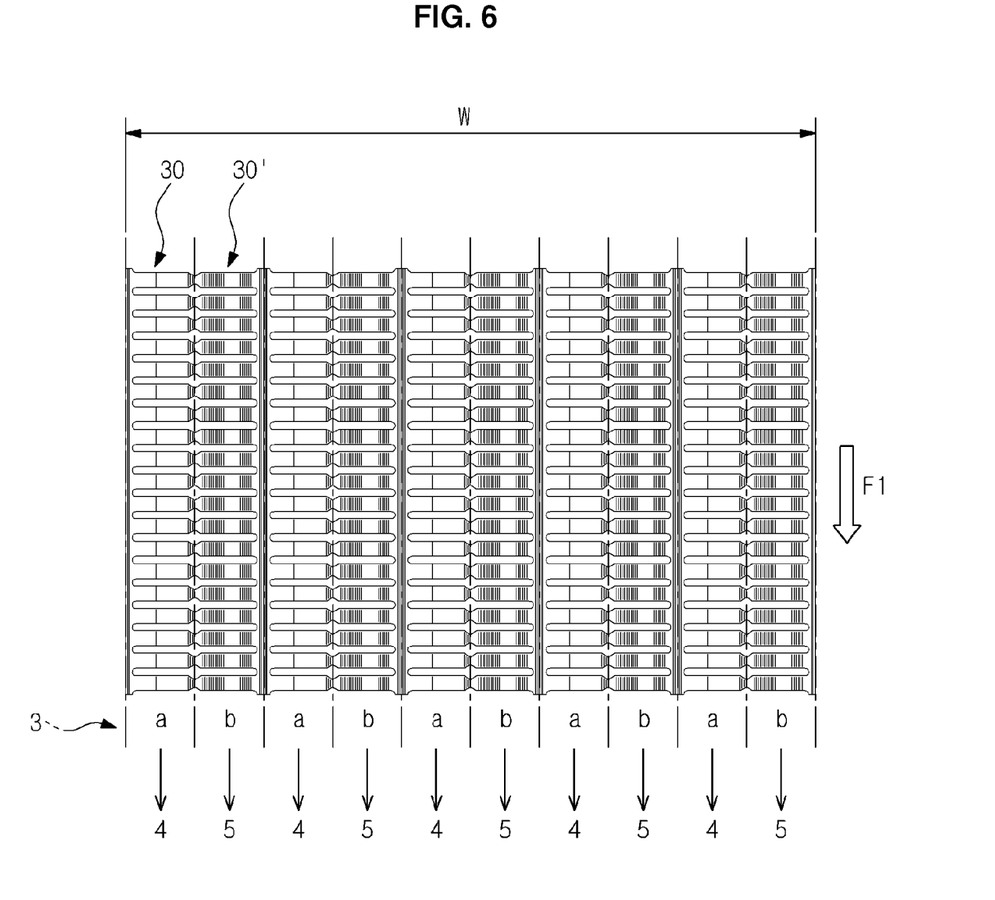
FIG. 6 is a view illustrating the heat exchange fins in accordance with the embodiment of the present disclosure which are formed in a mold.
Figure 7:
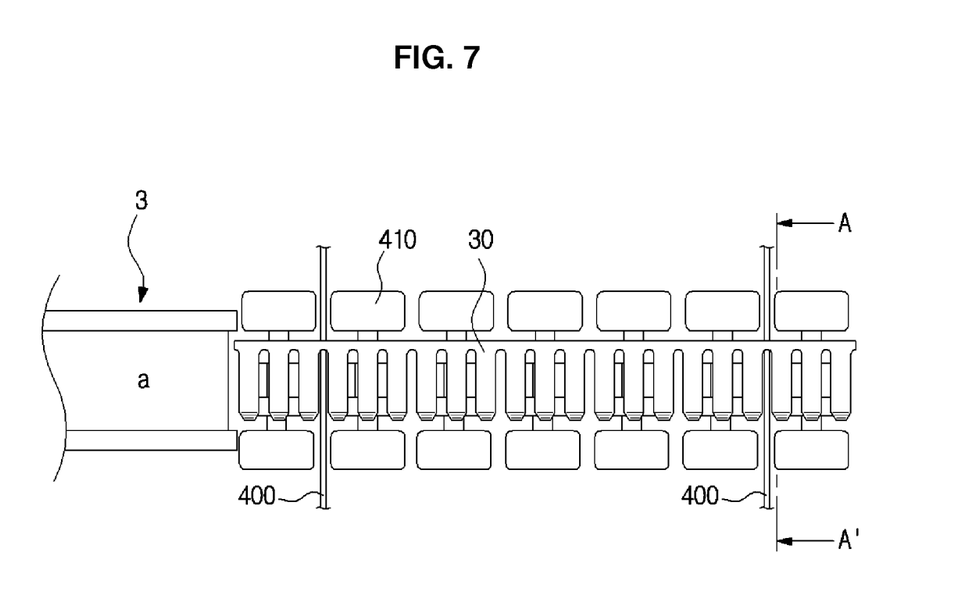
FIG. 7 is a view illustrating the heat exchange fin in accordance with the embodiment of the present disclosure which is transferred by a transfer apparatus.
Figure 8:
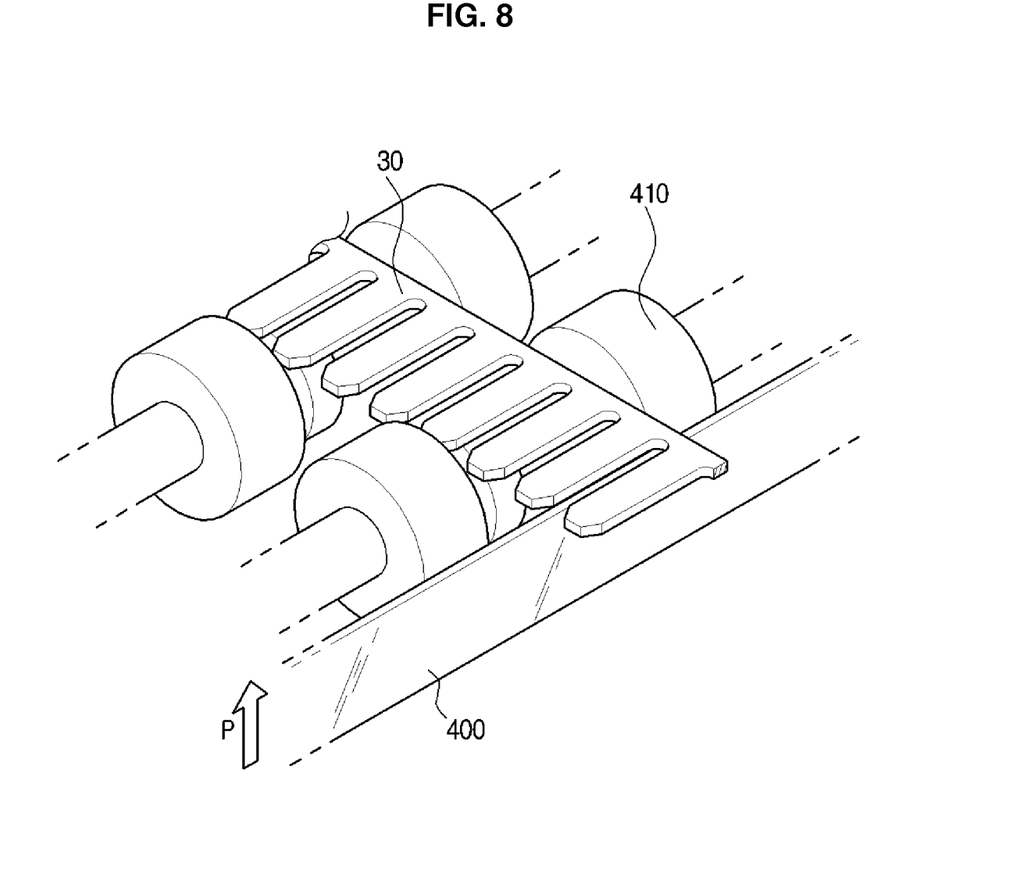
FIG. 8 is a cross-sectional view illustrating the heat exchange fin in accordance with the embodiment of the present disclosure when the heat exchange fin is transferred by the transfer apparatus.
Figure 9:
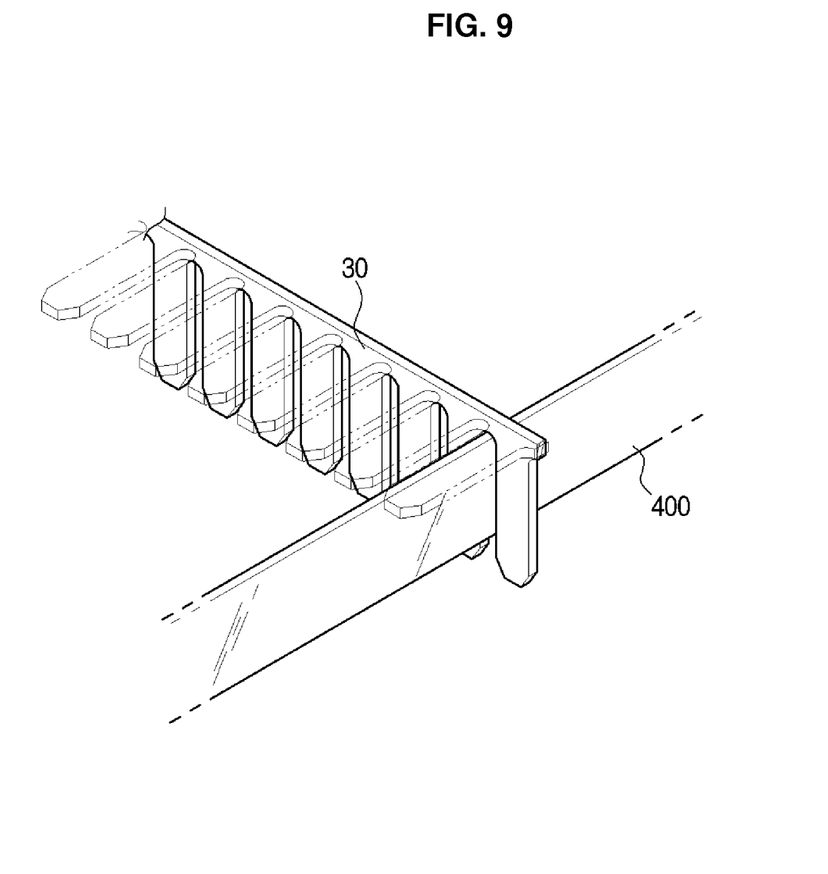
FIG. 9 is a cross-sectional view illustrating the heat exchange fin in accordance with the embodiment of the present disclosure when the heat exchange fin is rotated and aligned on an integration apparatus.
Figure 10:
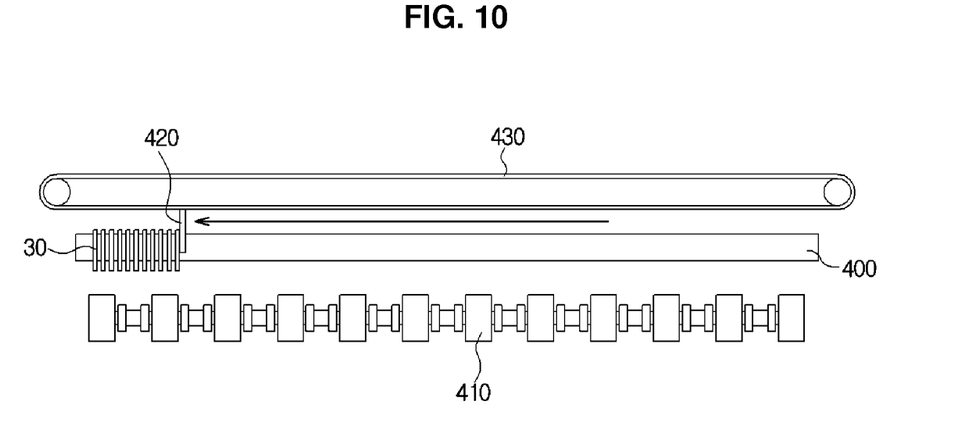
FIG. 10 is a view illustrating the heat exchange fins on the integration apparatus in accordance with the embodiment of the present disclosure which are integrated by a collector.

FIG. 6 is a view illustrating the heat exchange fins in accordance with the embodiment of the present disclosure which are formed in a mold, FIG. 7 is a view illustrating the heat exchange fin in accordance with the embodiment of the present disclosure which is transferred by the transfer apparatus, FIG. 8 is a cross-sectional view illustrating the heat exchange fin in accordance with the embodiment of the present disclosure when the heat exchange fin is transferred by the transfer apparatus, FIG. 9 is a cross-sectional view illustrating the heat exchange fin in accordance with the embodiment of the present disclosure when the heat exchange fin is rotated and aligned on the integration apparatus, and FIG. 10 is a view illustrating the heat exchange fins on the integration apparatus in accordance with the embodiment of the present disclosure which are integrated by the collector.

With reference to FIGS. 6 to 10, a thin metal sheet used as a material of the heat exchange fins 30 in accordance with the embodiment of the present disclosure may be transferred and stored in a state in which the thin metal sheet is wound on a roll and, in order to manufacture the heat exchange fins 30, the metal sheet wound on the roll may be unwound by the uncoiler 1 so as to be pressed (Operation S1). The metal sheet unwound by the uncoiler 1 may move to the pressing machine 2 and be punched at high speed by the pressing machine 2 and thus processed to have the shape of a heat exchange fin 30 (Operation S2). The metal sheet to manufacture the heat exchange fins 30 may be formed of aluminum.

The heat exchange fins 30 may be processed so as to be arranged in plural rows. As exemplarily shown in FIG. 6, the heat exchange fins 30 may be processed such that the ends of the contact ribs 31 of the neighboring heat exchange fins 30 may be opposite each other. For example, the heat exchange fins 30 may be processed such that the ends of the contact ribs 31 of the heat exchange fins 30 in odd-numbered rows a face the right side and the ends of the contact ribs 31 of the heat exchange fins 30 in even-numbered rows b face the left side.

The plural heat exchange fins 30 arranged such that the ends of the contact ribs 31 of the neighboring heat exchange fins 30 may be opposite each other may be transferred in the direction F1, in which the integration apparatuses 4 and 5 are located, by the transfer apparatus 3. The transfer apparatus 3 may include a conveyer belt or rollers. The plural heat exchange fins 30 may be placed on the conveyer belt or the rollers and thus transferred.

The integration apparatuses 4 and 5 include a first integration apparatus 4 and a second integration apparatus 5. Among the plural heat exchange fins transferred in the direction F1 by the transfer apparatus 3, the heat exchange fins 30 in the odd-numbered rows a may be transferred to the first integration apparatus 4 and the heat exchange fins 30' in the even-numbered rows b may be transferred to the second integration apparatus 5. That is, the heat exchange fins 30 in the odd-numbered rows a may be divided and transferred to the first integration apparatus 4 and the heat exchange fins 30' in the even-numbered rows b may be divided and transferred to the second integration apparatus 5. The manufacturing method of the heat exchange fins 30 in the odd-numbered rows a may be similarly applied as the heat exchange fins 30' in the even-numbered rows b.

The transfer apparatus 3 located adjacent to the integration apparatuses 4 and 5 may be provided as rollers 410. The plural heat exchange fins 30 and 30' may be transferred to the integration apparatuses 4 and 5 by the rollers 410. The integration apparatuses 4 and 5 may include integration units 400, and the integration units 400 may be provided under the rollers 410 adjacent to the integration apparatuses 4 and 5. The integration apparatuses 4 and 5 may include the first integration apparatus 4 and the second integration apparatus 5, the heat exchange fins 30 in the odd-numbered rows a may move to the first integration apparatus 4 to be integrated, and the heat exchange fins 30' in the even-numbered rows b may move to the second integration apparatus 5 to be integrated.

The integration units 400 may be wires or blades. The wires or the blades may extend in a direction vertical to the transfer direction of the heat exchange fins 30 and 30'. Two or more integration units 400 may be provided by a designated interval under the rollers 410. The integration units 400 may be provided so as to prevent interference with the transfer apparatus 3, such as the rollers 410. Thereby, the heat exchange fins 30 and 30' may be continuously transferred by the integration apparatuses 4 and 5 and the transfer apparatus 3.

As one example, the heat exchange fin 30 transferred by the transfer apparatus 3 may fall down at a point where the transfer apparatus 3 ends. The heat exchange fin 30 falling down may be placed on the integration units 400. The heat exchange fin 30 horizontally placed and transferred by the transfer apparatus 3 may stand vertically and be placed on the integration units 400. The integration units 400 may be inserted between neighboring contact ribs 31. While the heat exchange fin 30 falls down, the heat exchange fin 30 may be rotated by an angle of 90° and placed on the integration units 400. Here, the contact ribs 31 of the heat exchange fin 30 may face downward. The above description of the heat exchange fins 30 may be similarly applied to the heat exchange fins 30'.

As another example, the integration units 400 may rise in the upward direction P at the point where the transfer apparatus 3 ends. The integration units 400 may be inserted between the plural contact ribs 31 of the heat exchange fin 30. When the transfer apparatus 3 completely ends, the heat exchange fin 30 may be rotated by an angle of 90° so that the plural contact ribs 31 face downward. Thereby, the integration units 400 may be inserted between neighboring contact ribs 31 of the heat exchange fin 30 and the heat exchange fin 30 may be placed on the integration units 400.

As described above, heat exchange fins 30 may be sequentially placed on the integration units 400. Thereby, the plural heat exchange fins 30 may be sequentially placed on the integration units 400 under the condition that the integration units 400 are inserted between neighboring contact ribs 31 of the plural heat exchange fins 30.

The plural heat exchange fins 30 may be transferred and thus be integrated by a collector 42 so as to contact each other. The plural heat exchange fins 30 integrated on the integration units 400 may be separated by a designated interval by the interval maintenance parts 310 and 311. The collector 420 may be moved by a belt 430 located at one side of the integration unit 400. The belt 430 may extend in the moving direction of the heat exchange fins 30. When the belt 430 is rotated, the collector 420 mounted on the belt 430 pushes the plural heat exchange fins 30 so that the plural heat exchange fins 30 may be collected and integrated.

The integration units 400 may connect the transfer apparatus 3 and the alignment apparatuses 6 and 7. That is, the heat exchange fins 30 integrated on the integration units 400 may be moved to the alignment apparatuses 6 and 7. The alignment apparatuses 6 and 7 include a first alignment apparatus 6 and a second alignment apparatus 7. The heat exchange fins 30 integrated on the first integration apparatus 4 may be moved to the first alignment apparatus 6, and the heat exchange fins 30' integrated on the second apparatus 5 may be moved to the second alignment apparatus 7.

The integration unit 400 located adjacent to the alignment apparatuses 6 and 7 may be located at a lower position than the integration unit 400 located adjacent to the transfer apparatus 3. Thus, the heat exchange fins 30 placed on the integration units 400 may slide and move to the first alignment apparatus 6. Vibration may be applied to the integration units 400. By vibration applied to the integration units 400, the heat exchange fins 30 placed on the integration units 400 may slide and move to the alignment apparatus 6. Similarly to the heat exchange fins 30, the heat exchange fins 30' may slide and move to the second alignment apparatus 7.

Figure 11:
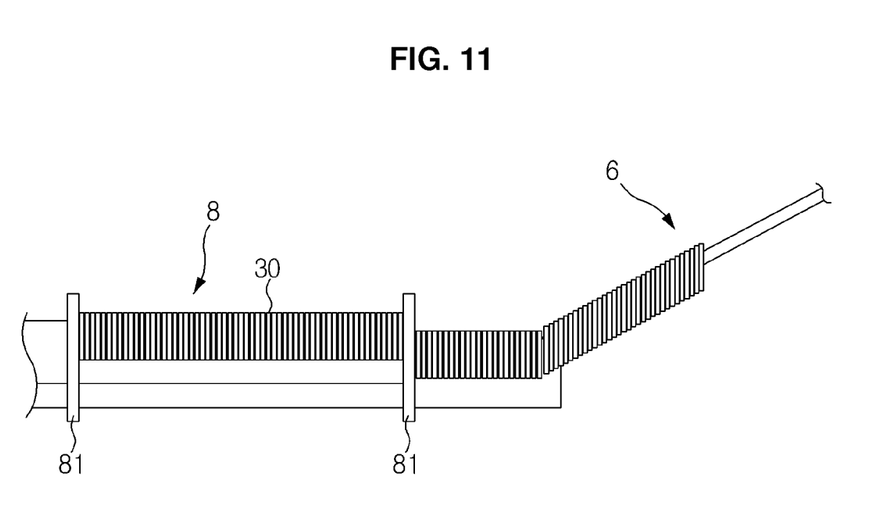
FIG. 11 is a view illustrating the heat exchange fins in accordance with the embodiment of the present disclosure which are separated by a separation apparatus.
Figure 12:
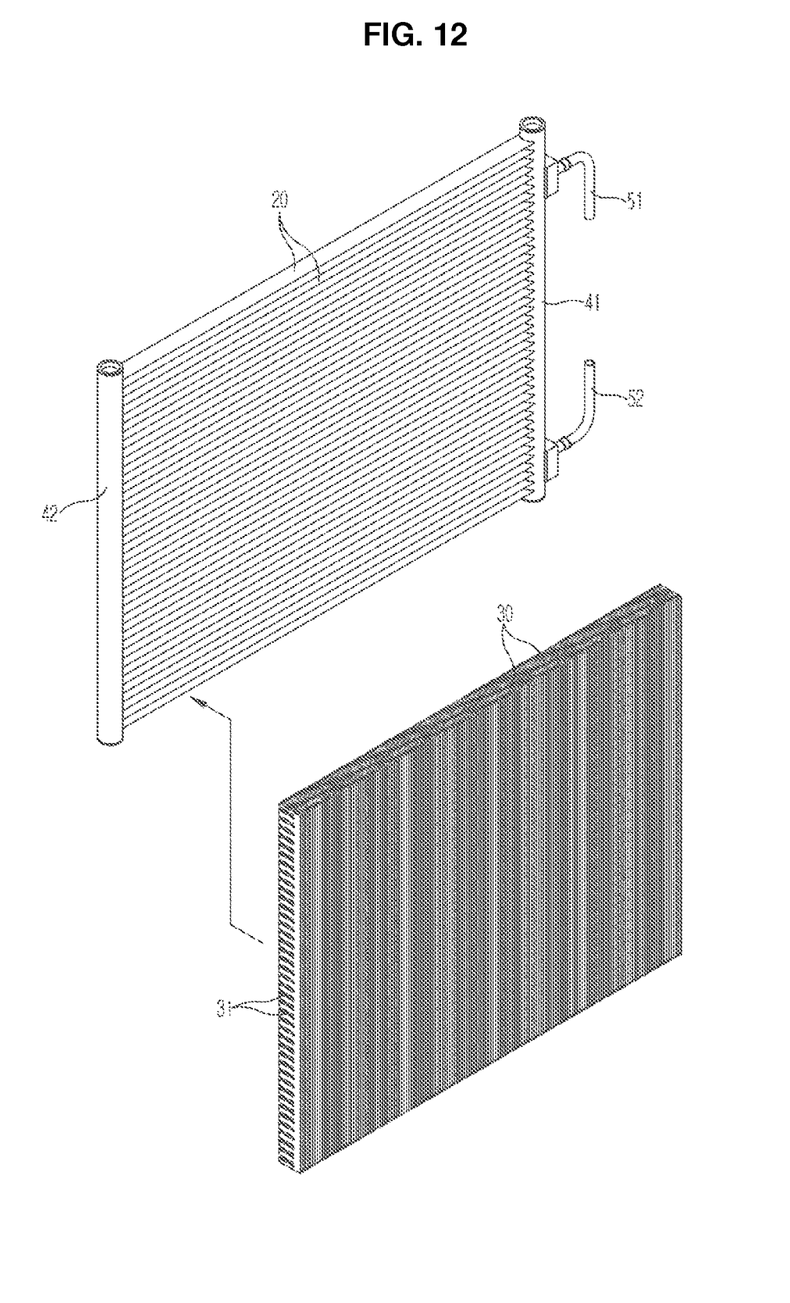
FIG. 12 is a perspective view illustrating the heat exchange fins in accordance with the embodiment of the present disclosure which are press-fitted into refrigerant tubes.

FIG. 11 is a view illustrating the heat exchange fins in accordance with the embodiment of the present disclosure which are separated by a separation apparatus and FIG. 12 is a perspective view illustrating the heat exchange fins in accordance with the embodiment of the present disclosure which are press-fitted into refrigerant tubes.

With reference to FIGS. 11 and 12, the plural heat exchange fins 30 and 30' in accordance with the embodiment of the present disclosure may move to the press-fitting apparatuses 8 and 9 and be press-fitted into the refrigerant tubes 20 by the press-fitting apparatuses 8 and 9. Thereby, the heat exchange fins 30 may be mounted on the refrigerant tubes 20.

The press-fitting apparatuses 8 and 9 include a first press-fitting apparatus 8 and a second press-fitting apparatus 9. The heat exchange fins 30 on the first alignment apparatus 6 may move to the first press-fitting apparatus 8 and be press-fitted to refrigerant tubes 20 provided in the first press-fitting apparatus 8. Similarly, the heat exchange fins 30' on the second alignment apparatus 7 may move to the second press-fitting apparatus 9 and be press-fitted to refrigerant tubes 20 provided in the second press-fitting apparatus 9.

A separation apparatus 81 to separate the heat exchange fins 30 and 30' into a number of heat exchange fins 30 and 30' which may be simultaneously press-fitted into the refrigerant tubes 20 may be provided in each of the press-fitting apparatuses 8 and 9. The separation apparatus 81 may be provided as blades. The separation apparatus 81 may be moved by a belt similarly to the collector 420, and separate the heat exchange fins 30 and 30' introduced into the press-fitting apparatuses 8 and 9 into a number of heat exchange fins 30 and 30' which may be simultaneously press-fitted into the refrigerant tubes 20. A group of plural heat exchange fins 30 or 30' separated by the separation apparatus 81 may be defined as a heat exchange fin unit. One heat exchange fin unit may be simultaneously press-fitted into the refrigerant tubes 20.

The heat exchange fin units provided in the designated number separated by the separation apparatuses 81 may be press-fitted into the refrigerant tubes 20 by the press-fitting apparatuses 8 and 9. The first header 41 and the second heater 42 may be mounted at both ends of the refrigerant tubes 20, and the plural heat exchange fins 30 may be press-fitted into the refrigerant tubes 20. After the plural heat exchange fins 30 are press-fitted into the refrigerant tubes 20, the first header 41 and the second heater 42 may be mounted at both ends of the refrigerant tubes 20.

The above-described heat exchanger manufacturing system may increase the size of a mold to manufacture the heat exchange fins 30 and thus, the heat exchange fins may be mass-produced. Since the heat exchange fins 30 may vertically stand and be integrated, integration and transfer of the heat exchange fins 30 are easy. Further, since a time taken for the heat exchange fins 30 to stand vertically and be integrated is shorter than a time taken the heat exchange fins 30 to be formed by punching, stoppage of operation of a pressing machine is not required to integrate the heat exchange fins 30 and thus, the heat exchange fins 30 may be continuously produced. Since equipment, such as integration apparatuses, alignment apparatuses, and press-fitting apparatuses, need not be separately provided in plural rows of the heat exchange fins 30 but is provided to correspond to the heat exchange fins 30 disposed in odd-numbered rows and the heat exchange fins 30 in even-numbered rows, an installation area of the equipment may be greatly reduced. Further, the plural heat exchange fins 30 are integrated, transferred, and separated using blades and thus, the equipment has simple configuration and low maintenance and repair costs.

As is apparent from the above description, in a manufacturing method of a heat exchanger in accordance with one embodiment of the present disclosure, plural heat exchange fins are disposed by a designated interval on a sheet and thus, the heat exchanger may be continuously mass-produced and a defect rate during manufacture of the heat exchanger may be reduced. The structure of a transfer apparatus transferring the plural heat exchange fins is improved and thus, manufacturing efficiency of the heat exchanger may be enhanced. Further, neighboring heat exchange fins are separated by a designated interval and thus, efficiency of the heat exchanger may be enhanced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A manufacturing method of a heat exchanger comprising:
   processing a metal sheet into a plurality of rows of heat exchange fins;
   transferring the plurality of rows of heat exchange fins through a transfer apparatus;
   dividing the plurality of rows of heat exchange fins into heat exchange fins in odd-numbered rows and heat exchange fins in even-numbered rows and integrating the heat exchange fins in odd-numbered rows and the heat exchange fins in even-numbered rows through integration apparatuses;
   vertically standing and aligning the heat exchange fins in odd-numbered rows and the heat exchange fins in even-numbered rows;
   separating the heat exchange fins in odd-numbered rows and the heat exchange fins in even-numbered rows into a number of heat exchange fins, which may be simultaneously press-fitted into refrigerant tubes, through separation apparatuses; and
   press-fitting the separated heat exchange fins into the refrigerant tubes.

2. The manufacturing method according to claim 1, wherein the pressing of the metal sheet into the plurality of rows of heat exchange fins is performed such that ends of contact ribs of neighboring heat exchange fins are opposite each other.

3. The manufacturing method according to claim 1, wherein, in the division of the plurality of rows of heat exchange fins into the heat exchange fins in odd-numbered rows and the heat exchange fins in even-numbered rows and the integration of the heat exchange fins in odd-numbered rows and the heat exchange fins in even-numbered rows on the integration apparatuses, the heat exchange fins in odd-numbered rows are integrated on a first integration apparatus and the heat exchange fins in even-numbered rows are integrated on a second integration apparatus.

4. The manufacturing method according to claim 1, wherein, in the vertically standing and aligning of the heat exchange fins in odd-numbered rows and the heat exchange fins in even-numbered rows, the heat exchange fins in odd-numbered rows and the heat exchange fins in even-numbered rows are rotated such that ends of contact ribs face downward.

5. The manufacturing method according to claim 1, wherein, in the vertically standing and aligning of the heat exchange fins in odd-numbered rows and the heat exchange fins in even-numbered rows, the heat exchange fins in odd-numbered rows and the heat exchange fins in even-numbered rows are aligned on integration units by inserting the integration units between neighboring contact ribs of each of the heat exchange fins in odd-numbered rows and the heat exchange fins in even-numbered rows.

6. The manufacturing method according to claim 5, wherein, in the vertically standing and aligning of the heat exchange fins in odd-numbered rows and the heat exchange fins in even-numbered rows, the heat exchange fins in odd-numbered rows and the heat exchange fins in even-numbered rows are integrated on the integration units by inserting blades between neighboring contact ribs of each of the heat exchange fins in odd-numbered rows and the heat exchange fins in even-numbered rows.

7. The manufacturing method according to claim 5, wherein vibration is applied to the integration units, and the heat exchange fins in odd-numbered rows and the heat exchange fins in even-numbered rows slide along the integration units by vibration applied to the integration units.

8. The manufacturing method according to claim 4, further comprising, when the heat exchange fins in odd-numbered rows and the heat exchange fins in even-numbered rows vertically stand and are aligned, transferring the heat exchange fins in odd-numbered rows and the heat exchange fins in even-numbered rows through a collector and integrating the heat exchange fins in odd-numbered rows and the heat exchange fins in even-numbered rows such that neighboring heat exchange fins contact each other.

9. The manufacturing method according to claim 8, wherein the heat exchange fins in odd-numbered rows and the heat exchange fins in even-numbered rows are transferred by blades mounted on a belt and moved such that neighboring heat exchange fins contact each other.

10. The manufacturing method according to claim 1, wherein, in the separation of the heat exchange fins in odd-numbered rows and the heat exchange fins in even-numbered rows into a number of heat exchange fins, which may be simultaneously press-fitted into the refrigerant tubes, through the separation apparatuses, the heat exchange fins in odd-numbered rows and the heat exchange fins in even-numbered rows are separated into a number of heat exchange fins, which may be simultaneously press-fitted into the refrigerant tubes, by blades.

11. The manufacturing method according to claim 1, wherein, in the press-fitting of the separated heat exchange fins into the refrigerant tubes, the separated heat exchange fins are press-fitted into the refrigerant tubes on which headers are mounted.

12. The manufacturing method according to claim 1, further comprising mounting headers on the refrigerant tubes, after the press-fitting of the separated heat exchange fins into the refrigerant tubes.

13. The manufacturing method according to claim 1, wherein the processing of the metal sheet into the plurality of rows of heat exchange fins is performed after the metal sheet wound on a roll is unwound into a state, in which pressing of the metal sheet may be performed, by an uncoiler.

14. The manufacturing method according to claim 4, wherein, in the vertically standing and aligning of the heat exchange fins in odd-numbered rows and the heat exchange fins in even-numbered rows, the heat exchange fins in odd-numbered rows and the heat exchange fins in even-numbered rows are integrated on integration units by inserting wires between neighboring contact ribs of each of the heat exchange fins in odd-numbered rows and the heat exchange fins in even-numbered rows.

15. The manufacturing method according to claim 14, wherein vibration is applied to the wires and the heat exchange fins in odd-numbered rows and the heat exchange fins in even-numbered rows slide on the integration units by vibration applied to the wires.

* * * * *